US008175005B2

(12) United States Patent
Okmyanskiy et al.

(10) Patent No.: US 8,175,005 B2
(45) Date of Patent: May 8, 2012

(54) COORDINATED NEIGHBOR DISCOVERY OF RADIO ACCESS POINT DEVICES AND MACRO BASE STATIONS

(75) Inventors: Anton Okmyanskiy, Vancouver (CA); Rajesh Pazhyannur, Sunnyvale, CA (US); Mark Grayson, Maidenhead (GB)

(73) Assignee: Cisco Technology, Inc., San Jose, CA (US)

( * ) Notice: Subject to any disclaimer, the term of this patent is extended or adjusted under 35 U.S.C. 154(b) by 266 days.

(21) Appl. No.: 12/507,477

(22) Filed: Jul. 22, 2009

(65) Prior Publication Data

US 2011/0019582 A1    Jan. 27, 2011

(51) Int. Cl.
*H04L 12/28* (2006.01)
(52) U.S. Cl. .................. 370/254; 370/331; 370/338
(58) Field of Classification Search .................. None
See application file for complete search history.

(56) References Cited

U.S. PATENT DOCUMENTS

| | | | | |
|---|---|---|---|---|
| 7,706,337 | B2 * | 4/2010 | Pandey et al. | 370/338 |
| 2006/0089964 | A1 * | 4/2006 | Pandey et al. | 709/203 |
| 2007/0021126 | A1 * | 1/2007 | Nanda et al. | 455/456.1 |
| 2008/0049702 | A1 * | 2/2008 | Meylan et al. | 370/342 |
| 2009/0129291 | A1 * | 5/2009 | Gupta et al. | 370/254 |
| 2009/0221287 | A1 * | 9/2009 | Balasubramanian et al. | 455/434 |
| 2010/0008235 | A1 * | 1/2010 | Tinnakornsrisuphap et al. | 370/241 |
| 2011/0019582 | A1 * | 1/2011 | Okmyanskiy et al. | 370/254 |

OTHER PUBLICATIONS

TR-196 Femto Access Point Service Data Model, Broadband Forum Technical Report, Apr. 2009, pp. 1-131.

* cited by examiner

*Primary Examiner* — Robert Wilson
(74) *Attorney, Agent, or Firm* — Edell, Shapiro & Finnan, LLC

(57) ABSTRACT

Techniques are provided for coordinated neighbor discovery in a wireless network served by radio access point devices that provide service in relatively small coverage areas in the wireless network. A controller apparatus sends to radio access point devices, data identifying a group of radio access point devices to which each radio access point device is assigned. The controller apparatus sends coordinating data for a neighbor discovery session during which a particular radio access point device in the group is configured to transmit a signal at maximum power during a time interval while all other radio access point devices in the group are configured to attempt to receive the signal, and to repeat the same during other time intervals during the neighbor discovery session when a different particular radio access point is configured to transmit a signal at maximum power until all of the radio access point devices in a group have transmitted. Each radio access point device generates discovery results data for signals received from one or more other radio access point devices during the neighbor discovery session. A neighbor list is generated for each radio access point device based on the discovery results. The neighbor list comprises a list of identifiers of radio access point devices that are candidates for handover of service.

22 Claims, 7 Drawing Sheets

US 8,175,005 B2

COORDINATED NEIGHBOR DISCOVERY OF RADIO ACCESS POINT DEVICES AND MACRO BASE STATIONS

TECHNICAL FIELD

The present disclosure relates to wireless communication networks, and more particularly to enhancing handover capabilities between radio access points in a wireless communication network.

BACKGROUND

In wide area wireless communication networks, relatively high power base station devices are provided to serve wireless client devices. Each base station device is capable of serving wireless client devices in a coverage area that is primarily determined by the power of the signal it can transmit. Wireless service to client devices located within large buildings becomes degraded because the client device has difficulty receiving a signal from the base station, even if the building is well within the coverage area of the base station.

To augment the coverage of the wireless network, wireless transceiver devices with relatively small coverage areas (and serving capacities) are deployed. Depending on their coverage area and serving capacities, these wireless transceiver devices are referred to as "femto" cell or "pico" cell access point devices. For simplicity and generality, the term radio access point (RAP) device is meant to refer to a wireless transceiver device that is configured to serve wireless client devices over relatively small coverage areas and with generally less capacity as compared to a macro base station that is configured to serve a relatively large coverage area and consequently many more client devices. The RAP devices may be deployed inside or near buildings to serve client devices where signals from a macro base station are too weak.

A client device may need to handover service from one RAP device to another RAP device in a manner similar to handing over service from one macro base station to another macro base station. For effective handover, each RAP device needs to know its neighbor RAP devices and macro base stations.

DESCRIPTION OF EXAMPLE EMBODIMENTS

Overview

Techniques are provided for coordinated neighbor discovery in a wireless network served by radio access point devices that provide service in relatively small coverage areas in the wireless network. The radio access point devices are grouped into location areas such as a group servicing the same building or floor. A controller apparatus sends to each radio access point device, data identifying the other radio access point devices assigned to the same group. The controller apparatus sends coordinating data for a neighbor discovery session during which a particular radio access point device in the group is configured to transmit a signal at maximum power during a time interval while all other radio access point devices in the group are configured to attempt to receive the signal, and to repeat the same during other time intervals during the neighbor discovery session when a different particular radio access point is configured to transmit a signal at maximum power until all of the radio access point devices in a group have transmitted. Thus, each radio access point device in the group transmits a signal at maximum power during a particular time interval during the neighbor discovery session and attempts to receive signals from other radio access point devices in the group during other time intervals during the neighbor discovery session. Each radio access point device generates discovery results data for signals received from one or more other radio access point devices during the neighbor discovery session. A neighbor list is generated for each radio access point device based on the discovery results. The neighbor list comprises a list of identifiers of radio access point devices that are candidates for handover of service.

Example Embodiments

Figure 1:
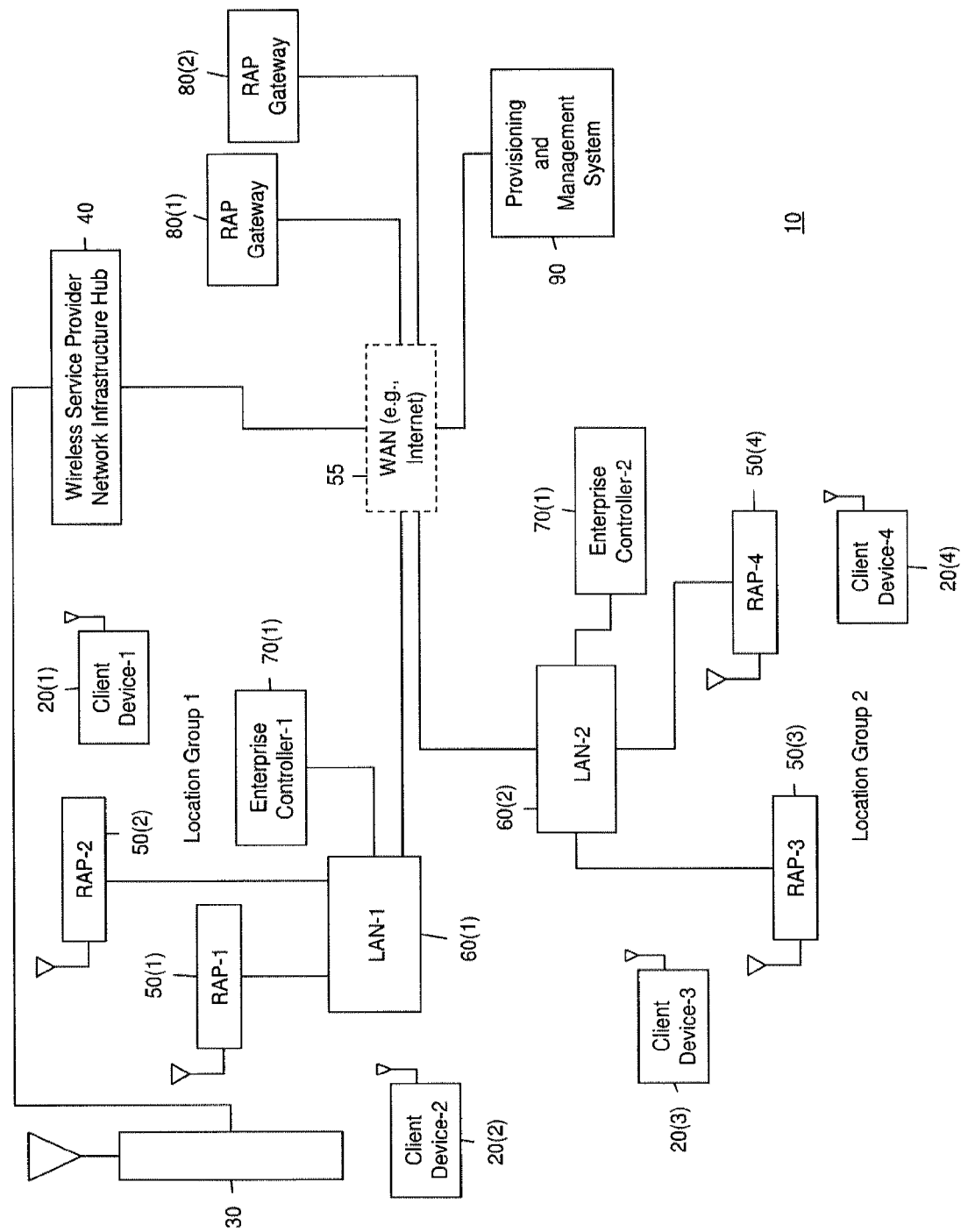
FIG. 1 is a block diagram that illustrates a wireless communication network and related infrastructure elements, and in which discovery of neighbor wireless radio access point devices is to be made to improve handover functionality.

Referring first to FIG. 1, a block diagram is shown of a wireless communication network 10 including several infrastructure elements that are configured to manage operations for the network 10 and to facilitate certain functions described herein. The network 10 is a wide area wireless communication network, such as one that is built according to the "3G" wireless communication standard specifications. The network 10 is designed to provide a variety of voice and data services to wireless client devices, examples of which are shown at reference numerals 20(1)-20(4). Wireless client devices are also known as user equipment (UE) in the 3G terminology. In order to serve wireless client devices, there are long range or "macro" wireless network transceivers (cell tower base station devices) that are configured to serve relatively large coverage areas (measured in miles or km). An example of a cell tower device is shown at 30. Only one macro cell tower device 30 is shown in FIG. 1 for simplicity but it should be understood that there are numerous such devices in a wireless network deployment, each of which connects to a wireless service provider network infrastructure hub 40. The wireless service provider network infrastructure hub 40 interfaces voice calls to a public telephone network (not shown) and interfaces voice or data sessions to a wide area network (WAN), e.g., the Internet, shown at reference numeral 55.

Recently, efforts have been made to improve the delivery of wireless services to client devices when they are out of range of a macro cell tower because they are located within a building, for example. Wireless service to client devices located within large buildings becomes degraded because the client device has difficulty receiving a signal from the base station, even if the building is well within the coverage area of the base station. Accordingly, wireless transceiver devices with relatively small coverage areas (and serving capacities) are deployed. Depending on their coverage area and serving capacities, these wireless transceiver devices are referred to as "femto" cell or "pico" cell access point devices. For simplicity and generality, the term radio access point (RAP) device is meant to refer to a wireless transceiver device that is configured to serve wireless client devices over relatively small coverage areas and with generally less capacity as compared to a macro cell tower. Another term for a RAP device is a micro base station and similarly a macro cell tower may be referred to as a macro base station. Examples of RAP devices are shown at 50(1)-50(4). In the 3G terminology, these RAP devices are referred to Home Node B (HNB) devices. Again, the RAP devices are configured to provide the same type of wireless services to client devices, but the wireless client devices are out of range of a macro cell tower. The relatively small coverage area of a RAP device is measured in terms of feet or meters.

The RAP devices may be deployed within or near a building (e.g., small or large business enterprise or a home) and are connected to a wired local area network (LAN). For example, RAP devices 50(1) and 50(2) are connected to a first LAN 60(1) and RAP devices 50(3) and 50(4) are connected to a second LAN 60(2). There may be several more RAP devices, but for simplicity they are not shown in FIG. 1. An enterprise controller may be associated with each group of deployed RAP devices. For example, FIG. 1 shows an enterprise controller 70(1) connected to the LAN 60(1) for RAP devices 50(1) and 50(2) and an EC 70(2) connected to LAN 60(2) for RAP devices 50(3) and 50(4). Each of the LANs 60(1) and 60(2) are connected to the Internet 55.

There are additional infrastructure elements shown in FIG. 1 to assist in managing the network 10. For example, there are one or more RAP gateway devices, two or which are shown at 80(1) and 80(2) in FIG. 1. A RAP gateway device is assigned to a group of RAP devices and serves as a gateway for control messaging and voice/data traffic to/from the RAP devices. A provisioning and management system 90 is also provided that serves as a more centralized control point to provision RAP devices in the network 10 and also to provide a user interface point for a network administrator to provide configuration commands/data as well as to view the status of the network 10. The provisioning and management system 90 may consist of one of multiple systems which may be in one or more locations. The provisioning and management system may communicate with the RAP gateway, enterprise controller and RAP devices directly or indirectly (such as by providing provisioning commands to an enterprise controller to be relayed to RAP devices.

In accordance with the 3G wireless network standards, each RAP device broadcasts a neighbor list containing a list of channels and scrambling codes of its neighbors to client devices in order to facilitate handover from one RAP device to another RAP device, or to/from a macro cell tower. Thus, the neighbor list serves as a list of radio parameters of RAP devices that are candidates for handover of service with respect to a client device within in the coverage area of the RAP device that is currently serving that client device. For example, the neighbor list comprises a transmit frequency, e.g., an UTRA Absolute RF Channel Number (UARFCN) and primary scrambling code (PSC) associated with a signal transmitted by each neighbor device. The client device performs measurements on radio signals received on these channels and reports results back to the RAP device. The RAP passes this data to the enterprise controller or RAP gateway, which interpret the data and may initiate client device handover to another base station when the client device report indicates a better signal from another RAP device or macro cell tower. In another form, the RAP may analyze the measurement results itself and make the handover decision.

During the handover, the RAP device may send a message that identifies the target base station (whether a RAP device or macro cell tower) by an identifier (ID), i.e., RAP Cell ID or Macro Cell ID. The channels and scrambling codes reported by a RAP device in measurement reports are by necessity re-used across the population of RAP devices. This means that each RAP device maps potentially the same channels and scrambling codes to different target Cell IDs corresponding to its neighbors. There are other ways to initiate handover from one RAP to another RAP or macro base station, such as initiating handover by a RAP device itself, by an enterprise controller or by a RAP Gateway.

The techniques presented herein address certain limitations with discovery of neighbor cells using conventional radio scan techniques. In particular, current radio scan techniques are based on receiving normal relatively low power transmissions from another RAP device. However, a client located between two RAP devices may be able to communicate with both RAP devices, but the two RAP devices may not be able to detect each other. For example, if the coverage area of each RAP device is 50 meters, and they are located 90 meters apart, then they may not detect each other during a normal radio scan. However, a client device located between those RAP devices (e.g. 45 meters from each) may be in the coverage area of both RAP devices. In this case, if the RAP devices are not in each other neighbor list, the handover from one RAP device to another is impeded. Static provisioning of neighbor lists is not a good solution because neighbor channels, scrambling codes, RAP identifiers and exact locations of RAP devices can change over time. Aggressive over-population of neighbor lists also leads to a waste of resources by UE in scanning extra channels, which has negative impact on battery power. An automated solution is needed.

To improve the ability of RAP devices to discover its neighbors (including macro neighbors), a coordinated neighbor discovery process is provided, control aspects of which are implemented within each RAP device and also within at least one controller apparatus, such as in one of the enterprise controllers 70(1) and 70(2), in one of the RAP gateway devices 80(1) and 80(2) or in the provisioning and management system 90. This coordinated neighbor discovery process is designed to build neighbor lists for each RAP device via a process of coordinated radio scans of neighbor RAP devices when a single RAP device (or perhaps a few RAP devices) transmits a signal, e.g., a beacon signal, at its maximum power. This mechanism allows RAP devices to detect neighbors whose coverage areas overlap, but which cannot otherwise be detected under normal transmission conditions. This coordinated neighbor discovery process ensures that a client device can properly handover from one RAP device to another when moving between these coverage areas. The information collected during this coordinated neighbor discovery process can also aid in populating the macro neighbors into the neighbor lists stored in RAP devices that cannot otherwise detect the macro cell towers, but whose coverage areas overlap with the macro cell tower. This aids in handover from a RAP device to a macro cell tower.

Figure 2:
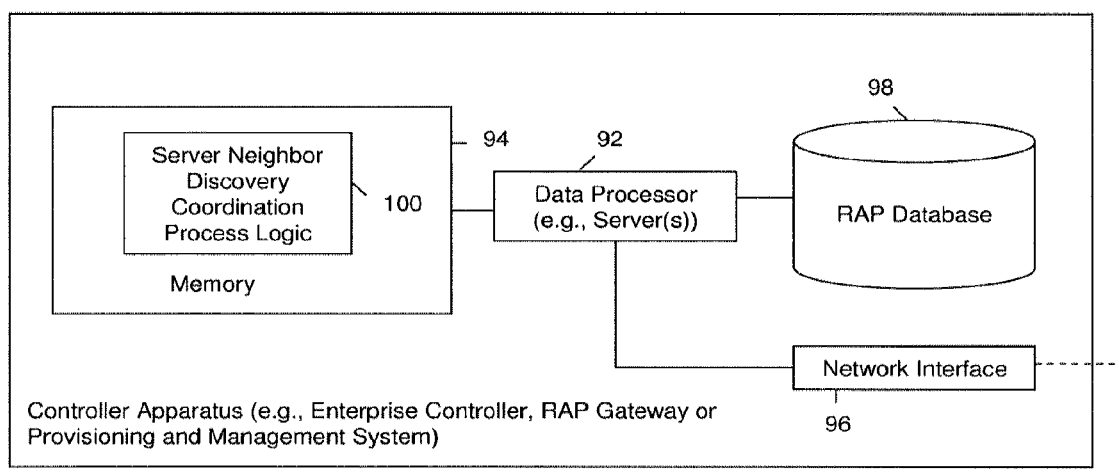
FIG. 2 is an example of a block diagram a controller apparatus that is configured with server neighbor discovery coordination process logic to initiate a neighbor discovery process among wireless radio access point devices.

Turning now to FIG. 2, an example of a block diagram is shown for a controller apparatus that is configured with server neighbor discovery coordination process logic in order to perform control or management functions associated with the coordinated neighbor discovery process. Thus, the controller apparatus depicted in FIG. 2 may be an enterprise controller 70(1) or 70(2), a RAP gateway device 80(1) or 80(2) or in the provisioning and management system 90. The controller apparatus is also referred to herein as the "coordinator" in connection with the coordinated neighbor discovery process. In the controller apparatus, there is a data processor (e.g., server computer) 92, memory 94, a network interface 96 and a RAP database 98. The memory 94 is a tangible memory medium that stores computer software instructions (executed by the data processor 92) for the various functions performed by the controller apparatus and described herein. To this end, the memory 94 stores instructions for server neighbor discovery coordination process logic 100. The network interface 96 facilitates communications between the controller apparatus and the various devices it communicates with over the Internet 55. The RAP database 98 stores IDs of RAP devices that are registered for service in the network 10 and also an indication of which RAP device belongs to which location group. The concept of a location group is described hereinafter.

Figure 3:
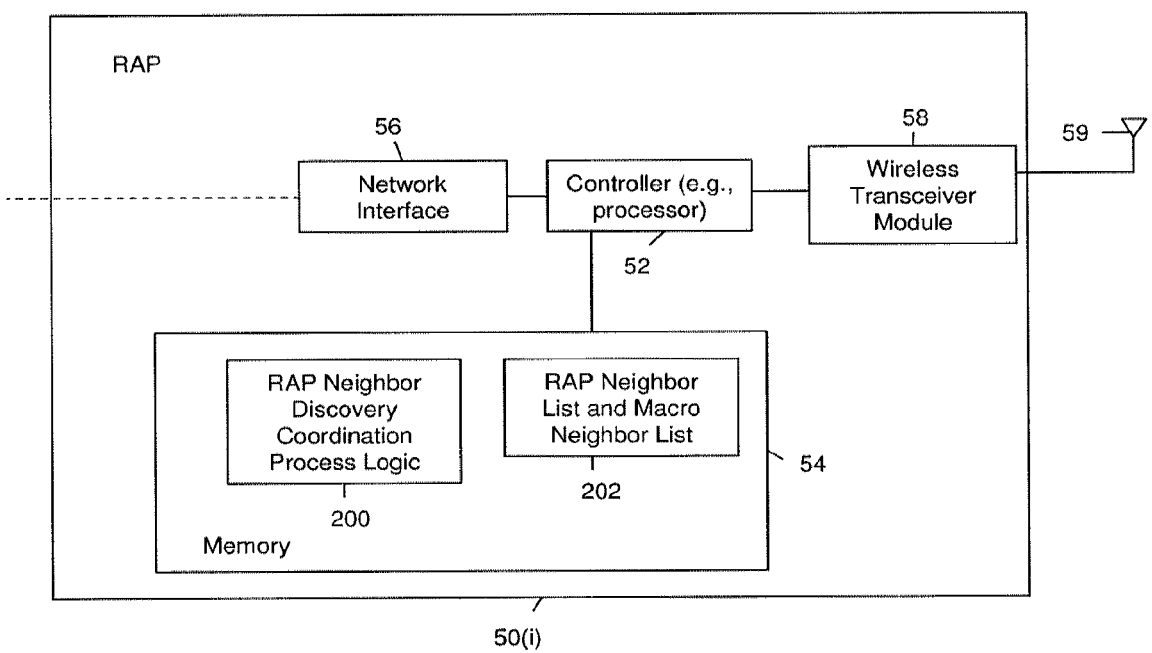
FIG. 3 is an example of a block diagram of a wireless radio access point (RAP) device that is configured with RAP neighbor discovery coordination process logic.

Turning to FIG. 3, an example of a block diagram of a RAP device shown at the generic reference numeral 50(1), is described. The RAP device comprises a controller (e.g., microprocessor, microcontroller, digital signal processor, etc.) 52, a memory 54, a network interface 56, a wireless transceiver module 58 and an antenna 59. The memory 54 may be volatile or non-volatile memory and stores instructions for RAP neighbor discovery coordination process logic 200. In addition, the memory stores a RAP neighbor list (i.e., micro neighbor list) and a macro neighbor list shown at 202 that contains data identifying neighbor RAP devices and macro cell towers discovered in the course of the coordinated neighbor discovery process described herein. The network interface 56 is configured to enable communications over the associated LAN and the Internet to the various control entities, e.g., an enterprise controller, RAP gateway device and the provisioning and management system. The wireless transceiver module 58 is configured to perform all of the wireless transmit and receive functions according to the wireless communication system standard, e.g., the 3G standard, and as is known in the art, comprises a radio transceiver configured to perform the radio frequency (RF) transmit and receive functions and a baseband signal processor or modem configured to perform the baseband signal processing functions. The wireless transceiver module 58 is also configured to make measurements of received signals, e.g., signals from other RAP devices or from a macro cell tower device. The wireless transceiver module 58 may output receive signal strength information (RSSI) data for measurements made on received signals and may also decode received transmitter identification data. Moreover, the wireless transceiver module 58 is configurable by the controller 52 to transmit a signal, such as a beacon signal with encoded information identifying the RAP device, on a given frequency channel (using a scrambling code) at a maximum power level (or other power level) greater than that used for normal transmissions, and for a designated time interval.

Figure 4:
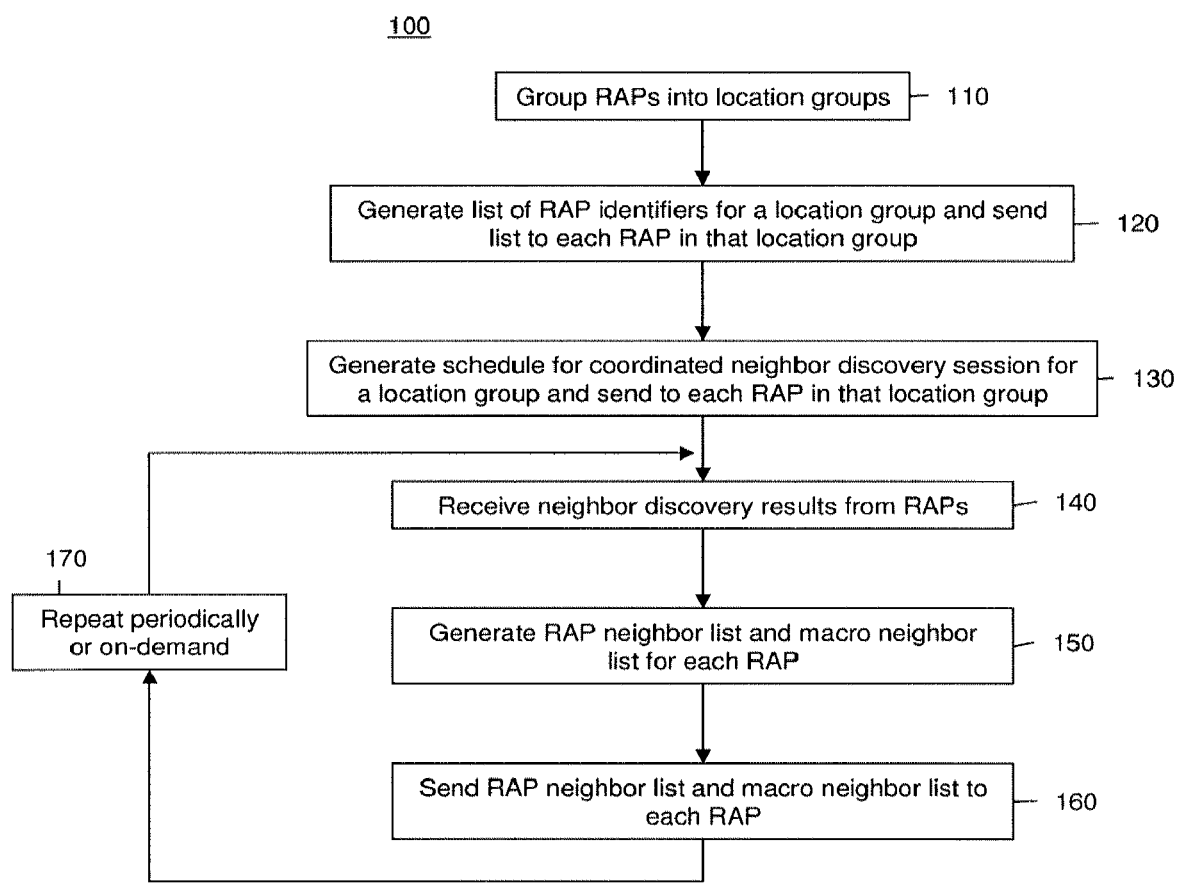
FIG. 4 is an example of a flow chart for the server neighbor discovery coordination process logic in the controller apparatus.

Turning now to FIG. 4, the server neighbor discovery coordination process logic 100 is described in detail. Reference is also made to FIG. 1 for purposes of describing FIG. 4. The server neighbor discovery coordination process logic 100 is performed by the controller apparatus that serves as the "coordinator" for the coordinated neighbor discovery process. At 110, the RAP devices that are to be part of the coordinated neighbor discovery process are grouped by location areas, such as a group or cluster servicing the same building or floor. The group to which a RAP device is assigned may be static and based on, for example, building, floor within a building, campus, enterprise, etc. In other words, the group assignment is determined by a network administrator and is fixed. However, in a variation to that, the group assignment of a RAP device may be dynamic and based on geographical latitude/longitude coordinates on a global grid determined via global positioning system (GPS) signals or based on macro coverage area estimates. FIG. 1 shows that a simplified example where RAP devices 50(1) and 50(2) are assigned to Location Group 1 and RAP devices 50(3) and 50(4) are assigned to Location Group 2. It is also possible that a RAP device may be assigned to multiple groups, particularly if there is a substantially large area of continuous RAP device coverage.

When a new RAP device is added to a network deployment, a network administrator may assign RAP with a given Equipment ID (EID) to a given location group. Before a coordinated neighbor discovery session can be run, it is first necessary to determine the frequency on which a new RAP device is to transmit. The frequency assigned to a RAP device is either configured manually by a network administrator or is dynamically selected by a RAP device from a set of permitted frequencies after a normal non-coordinated radio scan, or a combination thereof, to select a frequency that causes the least amount of inter-cell interference. In addition, at this time, the primary scrambling code (PSC) and power level are also determined for use in the traffic-bearing transmissions made by the RAP device during normal operations.

At 120, a list of RAP EIDs for a location group is generated and the list of RAP EIDs for each RAP device in a group is sent to those RAP devices. As a result, each RAP device in a group knows its own RAP EID and the RAP EID of other RAP devices in the same group. Additionally, a corresponding list of RAP Handover IDs (also known as Cell IDs) used for handover can be provided to each RAP. The RAP Handover IDs can also be obtained by a RAP device from broadcasts from other RAP devices by decoding the broadcast messages. The Handover IDs may change, for example, when a RAP device is assigned to a new RAP gateway. A RAP device can re-learn a correct Handover ID from over-the-air broadcasts, or from updates sent by a coordinating apparatus, such as the provisioning management system 90.

At 130, a schedule is generated for a neighbor discovery session for a location group and the schedule is sent to each RAP device in that group. The schedule comprises coordinating data that is configured to coordinate a neighbor discovery session. A coordinated neighbor discovery session is a period of time during which a RAP device in a group is configured to transmit a signal at maximum power during a time interval while all other RAP devices in the group are configured to attempt to receive the signal, and to repeat the same during other time intervals during the neighbor discovery session when a different RAP device is configured to transmit a signal at maximum power, until all of the RAP devices in a group have transmitted. The coordinated neighbor discovery session may be a time period during the day or evening or at some other time when there is expected to be minimal traffic for the RAP devices.

Figure 5:
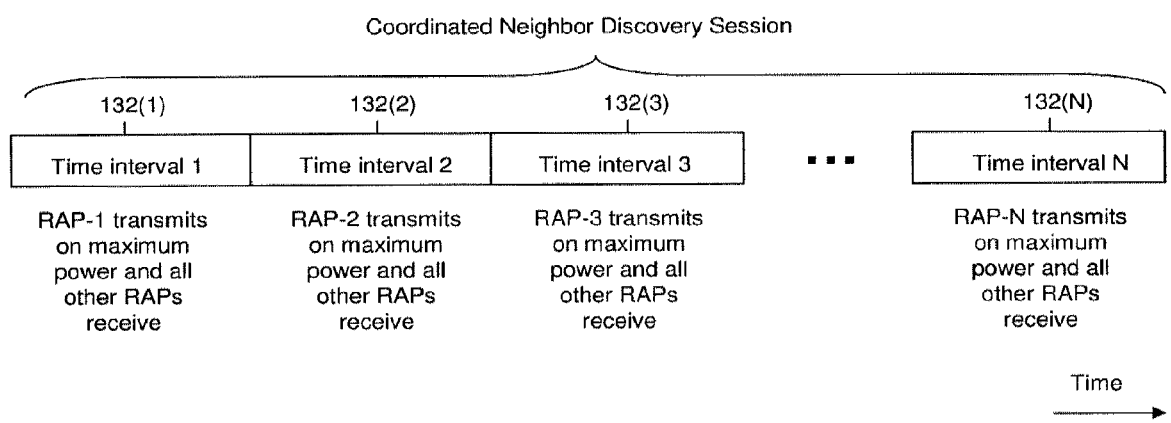
FIG. 5 is a timeline showing an example of a coordinated neighbor discovery session.

FIG. 5 illustrates a timing diagram depicting an example of a coordinated neighbor discovery session. There are multiple time intervals 132(1)-132(N) during a neighbor discovery session during which, generally only a single particular RAP device transmits a signal, e.g., a beacon signal, and all other RAP devices are configured to attempt to receive the beacon signal. While FIG. 5 shows that the time intervals 132(1)-132(N) are immediately consecutive, this need not be the case as there may be some fixed gap duration between successive time intervals.

The coordinating data may comprise data indicating an order for which respective ones of the RAP devices in a group are to transmit during the neighbor discovery session while all other RAP devices are configured to receive. In this form, the coordinating data provides the unique start time for the transmit interval for each RAP device. In another form, the coordinating data comprises data indicating when the neighbor discovery session is to be begin (e.g., a start time) but without any data to indicate the specific order of transmit intervals for RAP devices. In this case, each RAP device derives its time interval for transmission based on the start time and the RAP EIDs for the group. For example, the RAP EIDs may be an ordered sequence of IDs so that each RAP knows its position in the sequence or each RAP device can sort the EID list. Therefore, when each RAP device knows the duration of a transmit interval and its position in the sequence of RAP EIDs for a group, it can compute, relative to the scheduled start time, when its transmit interval begins and ends, and thus when to transmit a beacon signal on maximum power. Thus, as shown in the example of FIG. 5, the RAP device with the lowest EID in the sequence, e.g., RAP-1, knows that it is the first RAP device to transmit, during the first time interval 132(1) during the coordinated neighbor discovery session. The RAP device with the second lowest RAP EID knows that it is to transmit a period of time computed from the start time+a single Time Interval+optional gap duration, the RAP device with the third lowest RAP EID knows that is to transmits a period of time computed from the start time+2×Time Interval+optional 2×gap duration, and so on.

At some point in time during, before or after, each RAP device may be configured, by command from the central controller or autonomously, to attempt to receive a beacon signal from a macro cell tower on one or more designated channels. The RAP devices that receive the signal, measure its strength and may decode the signal to identify the Handover ID of the transmitting macro cell tower.

At 140, the controller apparatus receives neighbor discovery results comprising data pertaining to signals received by a given RAP device from other RAP devices during the neighbor discovery session. The neighbor discovery results comprise RSSI data for signals received by a RAP device from another RAP device during the coordinated neighbor discovery session and optionally the Handover ID for the discovered RAP. For example, RAP-1 would return RSSI data for beacon signals it received from RAP-2, . . . , RAP-N, assuming it was able to receive each of the beacon signals from the different RAP devices in its location group. A failure to receive a transmission may be indicated by a 0 RSSI data value. In addition, the neighbor discovery results may include RSSI data values associated with a signal received from one or more macro cell towers.

At 150, the controller apparatus analyzes the RSSI data values in the neighbor discovery results from each RAP device and decides whether to add a target RAP device to a neighbor list for a source RAP device. A source RAP device is the RAP device that transmits the beacon signal and a target device is a RAP device that may or may not receive the beacon signal from the source RAP device. For example, if during a transmit time interval, RAP-2 is transmitting, then RAP-2 is the source RAP device and RAP devices RAP-1 and RAP-3 through RAP-N in the same location group as RAP-2 are target RAP devices. When analyzing the RSSI data values received from the RAP devices, there are several ways to determine whether to add a target RAP device to a neighbor list for a source RAP device. One technique is to add a target RAP device to a neighbor list for a source RAP device when the RSSI data value reported by the target RAP device for that source RAP device is greater than a threshold. Another technique is to derive from the RSSI data value reported by a target RAP device a distance to the target RAP device from the source RAP device and when that distance is less than a threshold, the target RAP device is added to the neighbor list for the source RAP device. The distance is derived by applying appropriate mathematical computations to the RSSI data, which computations are effectively involve applying at least one scaling function to the RSSI data. Thus, the analysis of the RSSI data for purposes of neighbor determination may involve comparing the RSSI data or a scaling function thereof with a threshold and if the threshold is satisfied (greater than the threshold or less than the threshold), then the target RAP device is added to a neighbor list for a source RAP device.

Figure 6:
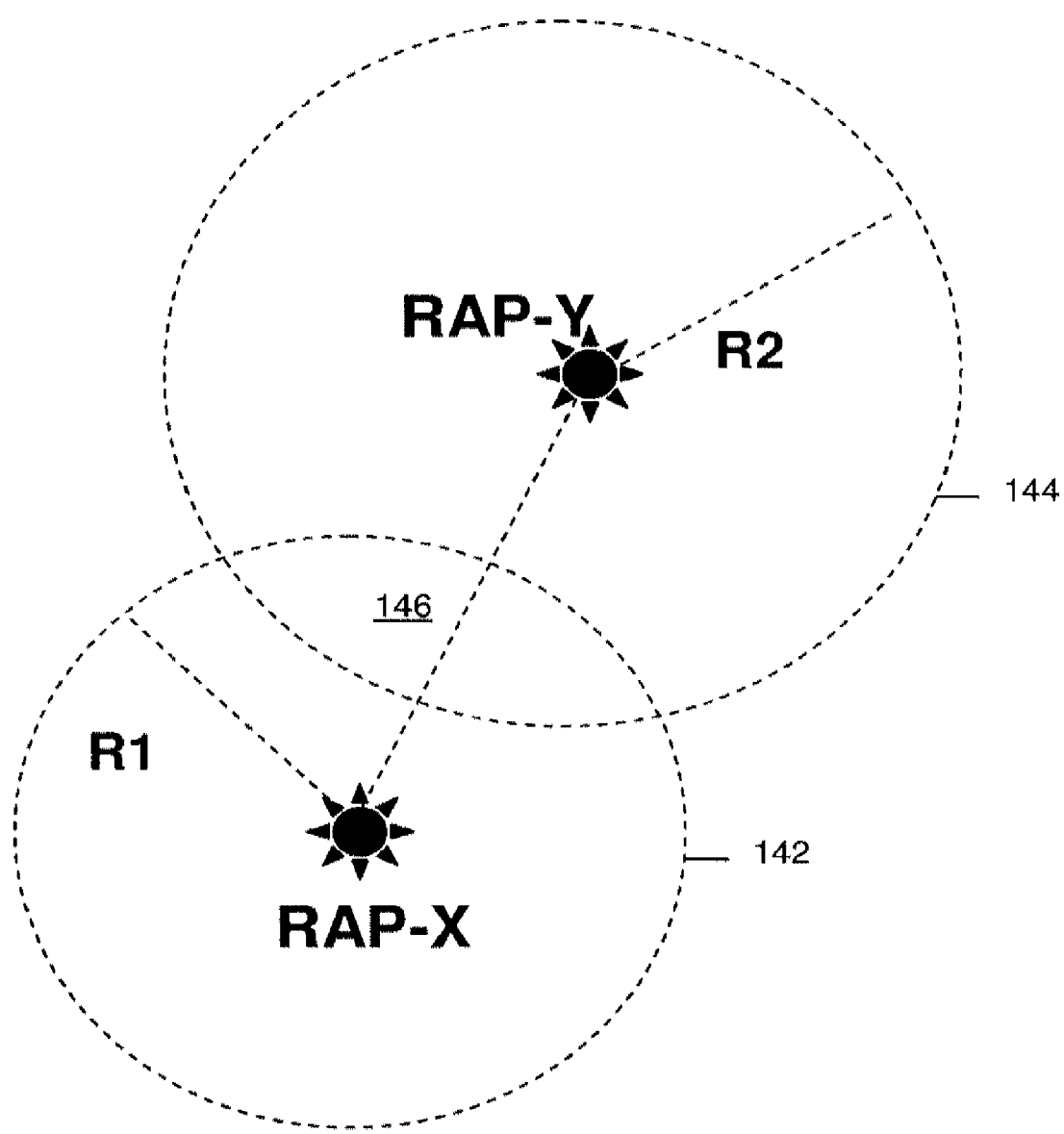
FIG. 6 is a diagram illustrating determining when the coverage areas of two radio access point devices overlap for purposes of generating an appropriate neighbor list.

Still another technique is described with reference to FIG. 6. In this technique, a distance is derived from the reported RSSI data value from a target RAP device as described above. However, the distance is then compared with a value that is equal to a sum of the radiuses of the coverage areas of the source RAP device and the target RAP device. For example, as shown in FIG. 6, a first RAP device, RAP-X, has a coverage area 142 of radius R1 and a second RAP device, RAP-Y, has a coverage area 144 of radius R2. R2 may be slightly larger than R1. Wireless client devices that are in the area of overlap, shown at 146, should be able to handover from RAP-X to RAP-Y. A normal radio scan (one that does not rely on the source RAP device to transmit with maximum power) may not let either RAP device detect the other because they are too far apart. However, using the coordinated neighbor discovery process described herein, RAP-X can detect a beacon transmitted (at maximum power) from RAP-Y and likewise RAP-Y can detected a beacon transmitted (at maximum power) from RAP-X. The distance between RAP-X and RAP-Y can be estimated based on the reported RSSI data values. In addition, values for the radiuses R1 and R2 can also be estimated using knowledge of the normal operational power of each RAP device. Therefore, when the distance D computed from the reported RSSI data values is less than the sum of the estimated radiuses R1 and R2, that is, D<R1+R2, then the RAP devices RAP-X and RAP-Y are said to have an area over overlap and each RAP device should be in the neighbor list of the other.

In performing the neighbor decision technique of FIG. 6, the RAP devices report to the controller (or in the autonomous form, to the other RAP devices), transmit power data indicating their normal transmit power. When the RAP devices report their discovery results at 140 (FIG. 4), they may also include the transmit power data. The radius (as a measure of the size of a coverage area) of a coverage area for each RAP device is estimated from the normal transmit power. The radius of coverage area of the RAP devices are used as in the neighbor decision scenario described in connection with FIG. 6.

Still another criterion in deciding whether to include a target RAP device in the neighbor list for a source RAP device is that there should be no more than one RAP device in a neighbor list for each RF channel and PSC. When multiple RAP devices are detected, the source RAP device that resulted in a greater RSSI at the target RAP device is added to the neighbor list of the target RAP device.

The controller apparatus also generates a macro neighbor list for a RAP device, where the macro neighbor list comprises an identifier of one or more a macro cell tower devices as a neighbor device for handover of service for a wireless client device. When transmitting the coordinating data at 130 to RAP devices in a group, the controller apparatus may also transmit data indicating one or more frequencies on which each RAP device is to attempt to detect transmission from macro base stations. The RAP devices may be configured to detect transmission from macro base stations during time intervals before, during or after the neighbor discovery session. Thus, when the RAP devices report their discovery results at 140, they may also include data indicating reception of signals received from one or more macro base stations. At 150, the controller apparatus records the macro neighbors detected by each RAP device and decides whether to include a macro cell tower device in a macro neighbor list for a RAP device. The decision as to whether to include a macro cell tower device in a macro neighbor list for a RAP device is based on the discovery results received from several RAP devices in a group and one or more of: administratively provisioned designations for RAP devices, neighbor relationships between RAP devices and geographic positions of the RAP devices and the macro base stations. For example, a policy may be established whereby all macro neighbor lists of each RAP device in a given location group should have a combination of all macro neighbors detected by each RAP device in the group. Another policy may be that only RAP devices which are adjacent to each other should share the same macro neighbors in their neighbor lists. That is, macro neighbors are designated in the macro neighbor list for RAP devices which are neighbors of the RAP device that discovered the macro base station. Still another policy is to assign a macro base station to a macro neighbor list based on whether there is an affinity to a macro coverage area of a macro base station based on expected geographic coverage area of each of a plurality of macro base stations and locations of the RAP devices. An example of an administratively provisioned designation is one in which a RAP device is designated by a network administrator as being in-building only and for which, consequently, macro base stations are to be excluded from its macro neighbors list; that is, the RAP device is to have a null macro neighbor list due to its geographic position in a building. It may be desirable to allow handover to a macro base station from certain RAP devices next to a window or near a building where RAP coverage may be poor, but not from other RAP devices which are deep inside the building. Yet another policy for macro neighbor determination is to exclude certain macro base stations from a macro neighbor list for a group of RAP devices. Still another policy is to include or add to the macro neighbor list for a RAP device a macro base station not discovered by any RAP device in the group, but which should nevertheless be included in the RAP device's macro neighbor list based on a priori known data for geographic locations of macro base stations and the RAP devices. This applies to a situation where a neighbor macro base station was not sensed by any RAP device in the group, but it needs to be in the macro neighbor list because it is known based data for geographic locations of macro base stations and RAP devices and from manual walk tests, etc. This policy is useful because a macro base station does not transmit at maximum power in order for RAP devices to detect it.

After the neighbor analysis is made at 150 to generate a neighbor list (both RAP neighbor list and macro neighbor list) for each RAP device in a location group, at 160 the controller apparatus sends messages to each RAP device to provide the RAP neighbor list and macro neighbor list for each RAP device.

Figure 7:
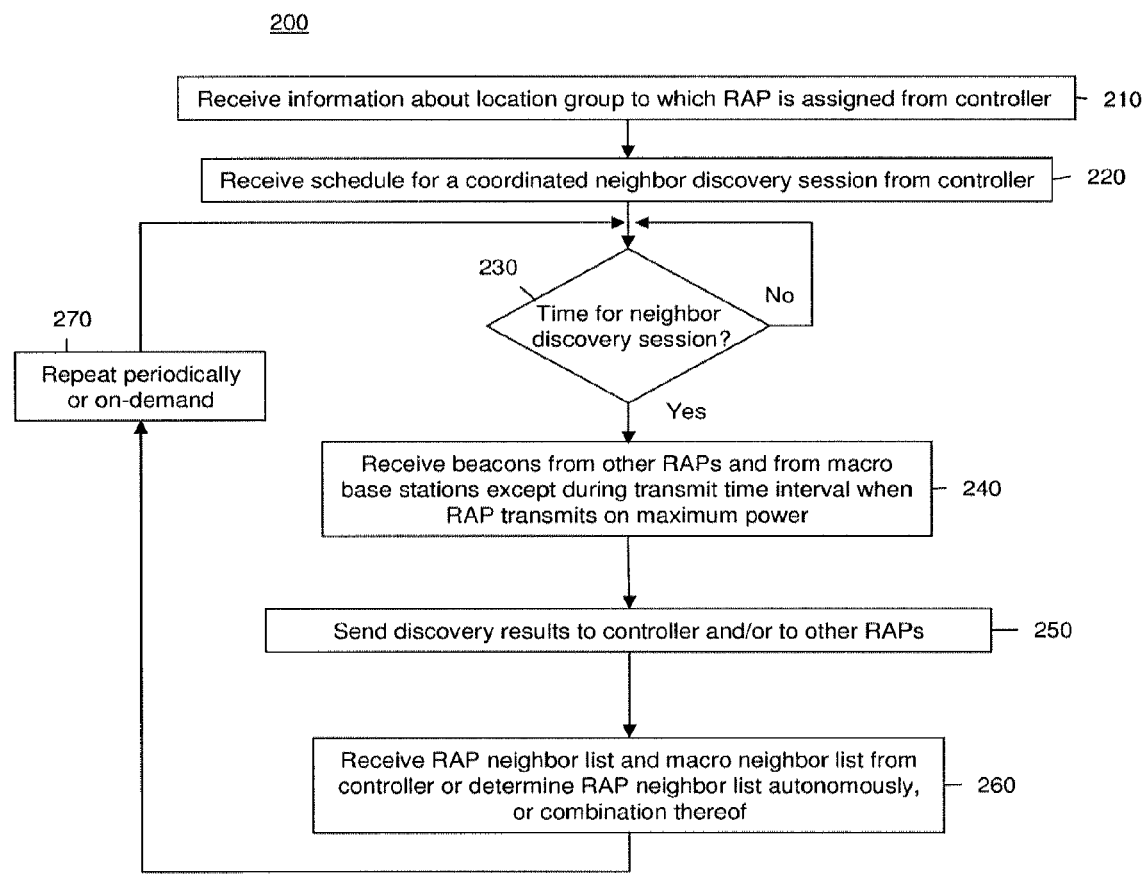
FIG. 7 is an example of a flow chart for the RAP neighbor discovery coordination process logic in a RAP device.

As described hereinafter in connection with FIG. 7, in another form of the coordinated neighbor discovery process, each RAP device may transmit its neighbor discovery results to other RAP devices so that each RAP device autonomously analyzes the neighbor discovery results to build its neighbor list.

The coordinated neighbor discovery session may be repeated on a periodic or on-demand basis as indicated at 170. Periodic re-run of the test allows RAP devices to adjust their neighbor lists based on changes in the environment such as RAP devices being added or removed, neighbor RAP devices changing their frequency, scrambling code or Handover ID, RAP devices being moved, changes to building structure or other radio obstacles, macro base stations being added, removed or reconfigured, etc.

To reiterate, the controller apparatus may perform a macro neighbor determination process that does not directly depend on a coordinated neighbor discovery session as depicted in FIG. 5. In summary, the macro neighbor determination process involves a controller apparatus configured to generate data to assign two or more RAP devices into groups and sending to each RAP device in a group data indicating frequencies on which to detect signals from one or more macro base stations that are configured to serve relatively large (macro) coverage areas. The controller apparatus receives discovery results from each of the RAP devices in the group, wherein the discovery results comprise data pertaining to macro base stations detected by RAP device. The controller apparatus generates a macro neighbor list specific to each RAP device in the group based on the discovery results received from one or more RAP devices in the group and one or more of: administratively provisioned designations for radio access point devices, neighbor relationships between radio access point devices and geographic positions of the radio access point devices and the macro base stations. The controller apparatus then sends to the RAP devices the corresponding macro neighbor list specific to each RAP device Turning now to FIG. 7, the RAP neighbor discovery coordination process logic 200 in a RAP device is now described. At 210, the RAP device receives from the controller apparatus information identifying the location group to which the RAP device is assigned. The RAP device also receives RAP EIDs of other RAP devices assigned to the same location group. Each RAP device knows, a priori, its own EID. The RAP may also receive a list of Handover IDs for each RAP device in the location group.

At 220, the RAP device receives from the controller information pertaining to a schedule for a coordinated neighbor discovery session. As explained above in connection with function 130 in FIG. 4, the RAP device may receive coordinating data in the form of schedule data that indicates an order for which respect ones of a plurality of RAP devices in a group are to transmit while all other radio access point devices in the group are configured to receive, or the RAP device may receive coordinating data in the form of a start time for the neighbor discovery session, and the RAP device derives data for the time interval when it is to transmit based on the start time and an identifier (e.g., EID) for the RAP device in the group to which it is assigned. Again, this is described above in connection with function 130 in FIG. 4. In addition, at 220, the RAP device may receive data indicating one or more frequencies on which to attempt to detect transmissions from macro base stations.

At 230, the RAP device determines whether it is time for a neighbor discovery session based on the coordinating data received at 120. If it is time for a neighbor discovery session, then at 240, the RAP device is configured to receive beacons from other RAP devices except for during the transmit time interval to which it is assigned to transmit a beacon signal on maximum power. Also at 240, when a RAP device receives a beacon from another RAP device, it computes an RSSI data value. Optionally, a RAP device may decode the received broadcast in order to retrieve the Handover ID (if it was not already provisioned into the RAP device). In particular, to determine the Handover ID for a neighbor macro cell tower, the RAP device would need to decode the received broadcast from the macro cell tower. The RAP device can distinguish a macro broadcast from a RAP broadcast based on specific channels it is configured to interpret as a macro neighbor (assuming a deployment using different macro and RAP channels). The RAP device may also receive radio signals on the one or more frequencies indicated to it for scanning for detection of macro base stations. As explained above, scanning for macro base stations may be performed before, during or after the neighbor discovery session.

After the neighbor discovery session is complete, at 250, each RAP device sends its discovery results (comprising UARFCN, PSC, Handover ID and RSSI data values for beacons received from other RAP device) to the controller apparatus and/or to other RAP devices in its location group. As described above, the neighbor discovery results may also include macro neighbor discovery results for signals received from one or more macro cell tower devices before, during or after the neighbor discovery session.

In the form of the coordinated neighbor discovery process where the controller apparatus performs the neighbor analysis, then at 250, each RAP device does not necessarily need to send its discovery results to each of the other RAP devices; rather, each RAP device sends its discovery results to the controller apparatus. The controller apparatus then analyzes the discovery results to generate a RAP neighbor list and macro neighbor list for each RAP device and at 260, sends the RAP neighbor list and macro neighbor list to each RAP device. On the other hand, each RAP device may be configured to operate more autonomously whereby it sends its discovery results to each of the other RAP devices in its location group and receives discovery results from each of the other RAP devices in its location group. Then, at 260, the RAP device generates its RAP neighbor list based on the discovery results received from all of the other RAP devices in its group. The analysis techniques for determining whether to include a target RAP device in a RAP neighbor list for a source RAP device are described above in connection with function 150 in FIG. 4, and each RAP device would perform the same analysis at 260. However, the controller apparatus would still perform the macro neighbor analysis for each RAP device and send a macro neighbor list to each RAP device. However, some basic macro cell tower selection may be done autonomously by RAP devices as well. For example, any macro cell tower detected by any RAP device in a group is added into the macro neighbor list for each RAP device. When the RAP device sends its discovery results (either to the controller apparatus for the non-autonomous configuration or to the other RAP devices in the autonomous configuration), the RAP device may also include transmit power data indicating its normal transmit power. As explained above, this enables the controller apparatus or another RAP device that receives this information to estimate the radius of the coverage area for that RAP device.

As shown at 270, the coordinated neighbor discovery process may be repeated periodically or on-demand.

The coordinated neighbor discovery process described herein provides for automatic discovery and re-discovery of neighbor RAP devices, particularly when the RAP devices have overlapping coverage areas but cannot detect each other from transmission they make at normal power levels. It also provides for a centralized determination of macro neighbors for the RAP devices.

The process logic described herein, i.e., process logic 100 and 200, may take any of a variety of forms, so as to be encoded in one or more tangible media for execution. For example, the logic may be in the form of software code instructions stored in memory for execution by the processor to perform the functions described herein. In another example, the logic may be in the form of digital logic gates, a programmable gate array device or other programmable or fixed logic device, configured to perform the functions described herein.

Although the apparatus, method, and logic are illustrated and described herein as embodied in one or more specific examples, it is nevertheless not intended to be limited to the details shown, since various modifications and structural changes may be made therein without departing from the scope of the apparatus, method, and logic and within the scope and range of equivalents of the claims. Accordingly, it is appropriate that the appended claims be construed broadly and in a manner consistent with the scope of the apparatus, logic, and method, as set forth in the following claims.

What is claimed is:

1. A method comprising:
   generating, by a controller apparatus that communicates with a plurality of wireless radio access point devices that serve wireless client devices in a wireless network, data to assign two or more of the wireless radio access point devices into groups;
   generating, by the controller apparatus, coordinating data for each group of radio access point devices to coordinate a neighbor discovery session during which a particular radio access point device in the group is configured to transmit a signal at maximum power in a time interval during which all other radio access point devices in the group attempt to receive the signal, and to repeat the same during other time intervals of the neighbor discovery session during which a different radio access point transmits a signal at maximum power, until all of the radio access point devices in the group have transmitted;
   sending the coordinating data from the controller apparatus to each radio access point device in the group;
   receiving, by the controller apparatus, discovery results from each radio access point device in the group, wherein the discovery results comprise, for a given radio access point device, data pertaining to signals received during the neighbor discovery session;
   generating, by the controller apparatus, a neighbor list for each radio access point device in a group based on the discovery results, wherein the neighbor list contains a list of identifiers of radio access point devices that are candidates for handover of service; and
   sending the neighbor list from the controller apparatus to each radio access point device.

2. The method of claim 1, wherein generating the coordinating data comprises generating data indicating an order for which respective ones of the radio access point devices in the group are to transmit during the neighbor discovery session while all other radio access point devices in the group are to receive.

3. The method of claim 1, wherein the discovery results comprise receive signal strength data for a signal received by a target radio access point device from a source radio access point device during the discovery session, and wherein generating the neighbor list comprises analyzing the receive signal strength data to determine whether to include the target radio access point device in the neighbor list for the source radio access point device.

4. The method of claim 3, wherein analyzing the receive signal strength data comprises comparing the receive signal strength data or a scaling function thereof with a threshold and adding the target radio access point device to the neighbor list for the source radio access point device when the threshold is satisfied.

5. The method of claim 3, and further comprising receiving from each radio access point device in the group, transmit power data indicating normal transmit power for each radio access point device, and estimating a radius for a coverage area for each radio access point device based on the transmit power data, and wherein analyzing comprises deriving from the receive signal strength data a distance to the target radio access point device from the source radio access point device, and adding the target radio access point device to the neighbor list for the source radio access point device when the distance is less than a sum of estimated radiuses of the coverage areas of the source radio access point device and the target radio access point device.

6. A method comprising:
receiving from a controller apparatus, by a wireless radio access point device that serves wireless client devices in a wireless network, data identifying a group of radio access point devices to which the radio access point device is assigned;
receiving, by the wireless radio access point device, coordinating data for a neighbor discovery session during which a particular radio access point device in the group transmits a signal at maximum power in a time interval during which all other radio access point devices in the group attempt to receive the signal, and to repeat the same during other time intervals during the neighbor discovery session when a different particular radio access point is configured to transmit a signal at maximum power, until all of the radio access point devices in the group have transmitted;
transmitting, by the wireless radio access point device, a signal at maximum power in a particular time interval during the neighbor discovery session and attempting to receive signals from other radio access point devices in the group during the other time intervals during the neighbor discovery session; and
generating, by the wireless radio access point device, discovery results data for signals received from one or more other radio access point devices during the neighbor discovery session.

7. The method of claim 6, wherein receiving coordinating data comprises receiving data indicating one or more frequencies on which to attempt to detect transmission from macro wireless network transceivers that serve relatively large coverage areas in the wireless network, receiving radio frequency energy on the one or more frequencies and including information in the discovery results data that indicates reception of signals from one or more macro wireless network transceivers.

8. The method of claim 6, wherein receiving coordinating data comprises receiving schedule data that indicates an order for which respective ones of a plurality of radio access point devices in the group are to transmit while all other radio access point devices in the group are to receive, and wherein transmitting is performed at the particular time interval during the neighbor discovery session based on the schedule data.

9. The method of claim 6, and further comprising receiving from the controller apparatus a list of identifiers for radio access point devices in the group, and wherein receiving the coordinating data comprises receiving data indicating a start time for the neighbor discovery session, and further comprising deriving data for the particular time interval when the radio access point device is to transmit based on the start time and an identifier for the radio access point device in the group to which it is assigned.

10. The method of claim 6, and further comprising transmitting the discovery results data to the controller apparatus, and receiving from the controller apparatus a neighbor list generated by the controller apparatus based on the discovery results data, wherein the neighbor list contains a list of identifiers of radio access point devices that are candidates for handover of service.

11. The method of claim 6, and further comprising sending to each of the other radio access point devices the discovery results data, and receiving from each of the other radio access point devices their respective discovery results data including receive signal strength data for the signal received from the radio access point device during the particular time interval, and analyzing the discovery results data from each of the other radio access point devices to determine whether to include one or more of the other radio access point devices in a neighbor list, wherein the neighbor list contains a list of identifiers of radio access point devices that are candidates for handover of service.

12. The method of claim 11, wherein analyzing the discovery results data comprises comparing the receive signal strength data or a scaling function thereof with a threshold and adding a target radio access point device to the neighbor list when the threshold is satisfied.

13. The method of claim 12, and further comprising sending to the other radio access point devices transmit power data indicating normal transmit power of the radio access point device, receiving from the other radio access point devices transmit power data indicating respective normal transmit powers thereof, and estimating a radius for a coverage area for each of the other radio access point devices, and wherein analyzing the discovery results data comprises deriving from the receive signal strength data a distance to another radio access point device, and adding the other radio access point device to the neighbor list when the distance is less than a sum of estimated radius of the coverage areas of the radio access point device and the other radio access point device.

14. An apparatus comprising:
a network interface to conduct communications over a wired network;
a wireless network transceiver module to conduct wireless communications with wireless client devices in a wireless network;
a processor coupled to the network interface and to the wireless network transceiver module, the processor configured to:
receive from a controller apparatus via the wired network data indicating assignment to a group of radio access point devices;
receive from the controller apparatus via the wired network coordinating data for a neighbor discovery session during which a particular radio access point device in the group transmits a signal at maximum power in a time interval during which all other radio access point devices in the group attempt to receive the signal, and to repeat the same during other time intervals during the neighbor discovery session when a different particular radio access point transmits a signal at maximum power until all of the radio access point devices in the group have transmitted;

transmit a signal via the wireless network transceiver module at maximum power during a particular time interval during the neighbor discovery session and attempt to receive signals from other radio access point devices in the group via the wireless network transceiver module during other time intervals during the neighbor discovery session; and generate discovery results data for signals received from one or more other radio access point devices during the neighbor discovery session.

15. The apparatus of claim 14, wherein the processor is further configured to receive from each of the other radio access point devices their respective discovery results data including receive signal strength data for the signal received during the particular time interval, and to analyze the discovery results data from each of the other radio access point devices to determine whether to include one or more of the other radio access point devices in a neighbor list, wherein the neighbor list contains a list of identifiers of radio access point devices that are candidates for handover of service.

16. One or more non-transitory computer readable tangible memory media storing instructions that, when executed by a processor, cause the processor to:

receive data assigning a wireless radio access point device to a group of radio access point devices;

receive coordinating data for a neighbor discovery session during which a particular radio access point device in the group transmits a signal at maximum power in a time interval during which all other radio access point devices in the group attempt to receive the signal, and to repeat the same during other time intervals during the neighbor discovery session when a different particular radio access point transmits a signal at maximum power until all of the radio access point devices in the group have transmitted;

generate for transmission a signal from the radio access point device at maximum power during a particular time interval in the neighbor discovery session and attempting to receive signals from other radio access point devices in the group during other time intervals during the neighbor discovery session; and generate discovery results data for signals received from one or more other radio access point devices during the neighbor discovery session.

17. The non-transitory computer readable tangible memory media of claim 16, wherein the instructions that cause the processor to receive coordinating data comprises instructions that cause the processor to receive schedule data that indicates an order for which respect ones of a plurality of radio access point devices in the group are to transmit while all other radio access point devices in the group receive, and wherein the instructions that cause the processor to generate the signal for transmission are based on the schedule data.

18. The non-transitory computer readable tangible memory media of claim 16, and further comprising instructions that cause the processor to receive a list of identifiers for radio access point devices in the group, and wherein the instructions that cause the processor to receive coordinating data comprises instructions that cause the processor to receive data indicating a start time for the neighbor discovery session, and further comprising instructions that cause the processor to derive data for the particular time interval when the radio access point device is to transmit based on the start time and an identifier for the radio access point device in the group to which it is assigned.

19. A method comprising:

generating, by a controller apparatus that communicates with a plurality of wireless radio access point devices that serve wireless client devices in a wireless network, data to assign two or more wireless radio access point devices into groups;

sending from the controller apparatus to each radio access point device in a group data indicating frequencies to detect signals from one or more macro base stations that are configured to serve relatively large coverage areas in the wireless network;

receiving by the controller apparatus discovery results from each radio access point device in the group, wherein the discovery results comprise data pertaining to macro base stations detected by the radio access point device;

generating, by the controller apparatus, a macro neighbor list specific to each radio access point device in the group based on the discovery results received from several radio access point devices in the group and one or more of: administratively provisioned designations for radio access point devices, neighbor relationships between radio access point devices and geographic positions of the radio access point devices and the macro base stations; and sending from the controller apparatus to the radio access point devices the corresponding macro neighbor list specific to each radio access point device.

20. The method of claim 19, wherein generating the macro neighbor list comprises generating the macro neighbor list for each radio access point device in a group to have a combination of all macro base stations detected by each radio access point device in the group.

21. The method of claim 19, wherein generating the macro neighbor list comprises determining whether there is an administratively provisioned designation of a radio access point device as in-building only and for which macro base stations are to be excluded from its macro neighbors list.

22. The method of claim 19, wherein generating the macro neighbor list comprises adding to the macro neighbor list for a radio access point device a macro base station not discovered by any radio access point device in the group based on data for geographic locations of macro base stations and of the radio access point devices.

* * * * *